United States Patent [19]

Brusson et al.

[11] Patent Number: 5,068,014
[45] Date of Patent: Nov. 26, 1991

[54] CATALYTIC COMPOSITION FOR THE POLYMERIZATION OF OLEFINS AND ITS PROCESS OF PREPARATION

[75] Inventors: Jean M. Brusson, Lambersart; Karel Bujadoux, Lens; Francis Petit, Villenuve D'Ascq; Jean M. Fuchs, Bouvigny Boyeffles; André Mortreux, Hem, all of France

[73] Assignee: Norsolor, Cedex, France

[21] Appl. No.: 369,229

[22] Filed: Jun. 22, 1989

[30] Foreign Application Priority Data

Jun. 23, 1988 [FR] France ............... 88 08447

[51] Int. Cl.$^5$ ............... C25C 1/00; C25F 5/00
[52] U.S. Cl. ............... 204/59 M; 204/131; 204/59 QM
[58] Field of Search ............... 204/131, 59 M, 59 QM

[56] References Cited

U.S. PATENT DOCUMENTS 3,546,083  3/1967  Ort et al. ............... 204/131
3,677,911  7/1972  Mottus et al. ............... 204/59 QM
3,787,383  1/1974  Mottus et al. ............... 204/59 QM Primary Examiner—John F. Niebling
Assistant Examiner—Caroline Koestner
Attorney, Agent, or Firm—Finnegan, Henderson, Farabow, Garrett & Dunner

[57] ABSTRACT

Process for the preparation of a catalytic composition for the polymerization of olefins. At least partial electrochemical oxidation of aluminum in a solvent of $\alpha,\omega$-dihalogeno-alkane and simultaneously the electrochemical reduction of a compound of titanium (IV) occur in process.

The catalytic composition comprises at least one titanium compound, at least one halogenated organo-aluminum compound and at least one inorganic magnesium compound in suspension in at least one $\alpha,\omega$-dihalogeno-alkane. The titanium compound is essentially a titanium (III) compound. The overall content of titanium (II) and titanium (IV) is less than or equal to 15% of the total titanium content.

14 Claims, 1 Drawing Sheet

CATALYTIC COMPOSITION FOR THE POLYMERIZATION OF OLEFINS AND ITS PROCESS OF PREPARATION

BACKGROUND OF THE INVENTION

The present invention concerns a process for the preparation, by an electrochemical route, of a catalytic composition for the polymerization of olefins, a catalytic composition for this polymerization, and an application of the catalytic composition to the polymerization of olefins More particularly, the present invention relates to the polymerization of ethylene and the copolymerization of ethylene with at least one α-olefin.

Means of obtaining catalysts containing at least one derivative of a transition metal, also known as "Ziegler-Natta catalysts," and their use for the polymerization of a α-olefins have been known for a long time. Those skilled in the art have sought ceaselessly to improve these catalysts to increase their catalytic activity and/or influence the characteristics of the polymers obtained.

Work has also been carried out with the object of using Ziegler-Natta catalysts under high temperature conditions to permit a shorter contact time between the olefin to be polymerized and the catalyst. This would result in an increase of the productivity of the installations. The catalyst must, therefore, have a high stability which is compatible with these drastic conditions of polymerization as well as a high activity and a high initial rate of polymerization.

Increasing the catalytic activity of Ziegler-Natta catalysts is a constant preoccupation which aims simultaneously, by the utilization of smaller quantities of catalyst, to reduce the manufacturing cost of the polymer and to obtain polymers in which the level of catalytic residues is as low as possible. The latter objective has primarily the purpose of avoiding purification of the polymers and of obtaining, without purification, polymers which have no tendency to degrade mechanically and/or thermally, during or after conversion into finished products.

It is known from another source that compounds of titanium of valency II are very slightly active in Ziegler-Natta catalysis. Many titanium compounds exist at the maximum valency (IV) and their reduction leads to mixtures of compounds of titanium (III) and of titanium (II) which become less active as the level of titanium (II) increases. One problem in the improvement of Ziegler-Natta catalysts is, therefore, to obtain, by reduction of compounds of titanium (IV), compounds of titanium (III) essentially exclusive of compounds of titanium (II).

The applicant has now found that it is possible to resolve this problem by means of a new process for the reduction of compounds of titanium (IV). The catalytic compositions obtained by this process have a very high activity regardless of the conditions of polymerization.

It is known to prepare components of Ziegler-Natta catalysts by an electrochemical route. For example, U.S. Pat. No. 3,787,383 describes an electrolytic process for preparing certain bis(metal halide)methanes, such as bis(dichloroaluminum)methane $Cl_2AlCH_2AlCl_2$. By this process, an electrolyte of formula $HOAlCl_2$ is electrolysed in the presence of a methylene dihalide, such as $CH_2Cl_2$, or a gem-dihalide between an aluminum anode and a cathode of the same metal or of an inert material, such as platinum or carbon. A derivative of a transition metal is added to the resulting activator to obtain the catalytic system. This transition metal derivative does not undergo reduction.

It is also known from U.S. Pat. No. 3,546,083 to prepare simultaneously the two components (catalyst and activator) of the catalytic system by electrolysis of a medium containing a methylene dihalide and an electrolyte, such as $HOAlCl_2$. The anode is constituted by a transition metal associated with aluminum and the cathode, which is not consumed during electrolysis, is a metal or graphite The preparation of the transition metal compound, therefore, takes place by oxidation of the metallic anode. It is not specified in what valency state the transition metal is found in the compound formed.

SUMMARY OF THE INVENTION

The applicant has now found that it is possible to prepare the two components of the catalytic system simultaneously by electrolysing a dihalogenated compound in the presence of an anode containing aluminum (preparation of the activator) and simultaneously reducing a compound of titanium (IV) at the cathode (preparation of the catalyst).

More specifically, the present invention provides a process for the preparation of a catalytic composition for the polymerization of olefins. That process comprises at least partial electrochemical oxidation of aluminum in a halogenated solvent of the α,ω-dihalogenalkane type and simultaneously the electrochemical reduction of a compound of titanium (IV).

These and other features and advantages of the present invention will be made more apparent from the following description of the preferred embodiment.

DESCRIPTION OF THE DRAWING

FIG. No. 1 is an electrolytic cell for preparing catalytic compositions of the present invention.

DESCRIPTION OF THE PREFERRED EMBODIMENT

Figure 1:
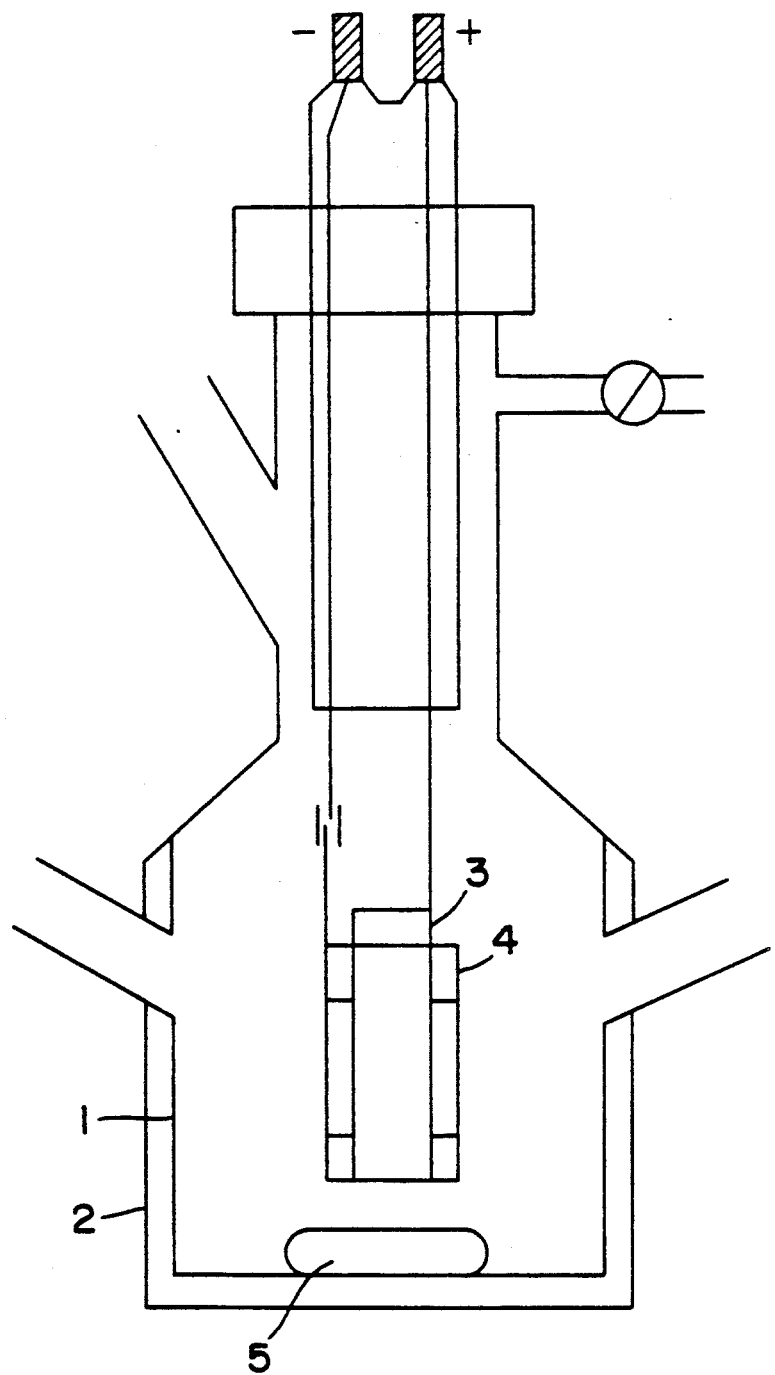

The α,ω-dihalogenoalkane has the general formula $X-(CH_2)_n-X'$ in which X and X', which may be identical or different, are each a halogen atom, such as chlorine, bromine and fluorine, and n is an integer between 1 and 10, preferably between 1 and 6. The nature of the halogen atoms and the value of n are such that the α,ω-dihalogenalkane is liquid under normal conditions of temperature and pressure. Among the compounds corresponding to the preceding general formula, dichloromethane, 1,2-dichloroethane and 1,4-dichlorobutane or their mixtures are advantageously chosen.

To reduce the quantity of halogenated solvent while preserving the same concentration of titanium (IV) compound, it is preferred to carry out the simultaneous electrochemical oxidation and reduction in the additional presence of an inert solvent. This solvent is preferably chosen from the saturated aliphatic or cycloaliphatic hydrocarbons having from 6 to 14 carbon atoms, whose boiling point, at atmospheric pressure, is not lower than 60° C., and their mixtures. It could be, for example, a cut of $C_{10}$–$C_{12}$ saturated aliphatic hydrocarbons. The inert solvent is used in a quantity which can be up to 100 parts by weight, per 100 parts by weight of the halogenated solvent.

The simultaneous electrochemical oxidation and electrochemical reduction preferably take place in an electrolytic cell by passing an electric current between an anode and a cathode which are immersed in the electrolyte containing the halogenated solvent, if necessary with the addition of an inert solvent, and the compound of titanium (IV). By reason of its constitution, this electrolyte is a poor conductor; however, it is possible to increase its conductivity by adding to it quantities, which may be up to 10 times the quantity of the titanium (IV) compound (expressed in moles), of at least one higher olefin. For this purpose, an α-olefin having, for example, from 4 to 16 carbon atoms, preferably hex-1-ene, may be used.

The process according to the invention is carried out at a temperature of between 0° C. and the boiling point of the solvent (halogenated and, if necessary, inert) or that of the α-olefin. Since the electrolysis is exothermic, a means of cooling the reaction medium is to be provided together with, if necessary, an electrolytic cell which is capable of functioning under slight over-pressure (up to about 2 bars).

The titanium (IV) compound subjected to electrochemical reduction is chosen from the compounds of general formula $Ti(OR)_nX_{4-n}$ in which X is a halogen atom chosen from fluorine, chlorine, bromine and iodine; R is an alkyl radical having from 1 to 10 carbon atoms; and $0 \leq n \leq 4$. Preferably, the titanium (IV) compound is titanium tetrachloride, diethoxytitanium dichloride or di(n)butoxytitanium dichloride. The concentration of the titanium (IV) compound in the reaction medium is advantageously between 20 and 600 millimoles per liter. Although a high concentration leads to conductivity problems and problems with diffusion of the species in a medium whose viscosity has been increased, it does, on the other hand, permit the molar ratio halogenated solvent/ titanium in the catalyst obtained to be reduced and, thus, the drawbacks of the presence of too large a quantity of the halogenated compound during polymerization is avoided.

According to a variant of the process of the present invention, it is possible to add a vanadium (IV) or vanadium (V) compound, chosen from the compounds of general formula $VO(OR)_mX_{3-m}$ in which X is a halogen; R is an alkyl radical having from 1 to 6 carbon atoms; and $0<m<3$, and the compounds of formula $VX_4$, in which X is a halogen, to the reaction medium during electrolysis. Examples of such compounds are $VCl_4$ and $VOCl_3$. The concentration of the vanadium compound in the reaction medium is advantageously between 0 and 100 millimoles per liter.

Analyses carried out on the reaction mixture after the electrochemical oxido-reduction under various conditions have shown that, in a surprising manner, whatever quantity of electricity has passed through the reaction medium, the titanium (IV) derivative was not reduced beyond the (III) degree of oxidation. It has thus been found that it is possible to pass the quantity of current necessary to generate the halogenated organoaluminum compound without modifying the degree of oxidation of the titanium (III) compound obtained. Simultaneous electrochemical oxidation and electrochemical reduction are thus, in an advantageous manner, carried out by passing a quantity of electricity of between 1 and 12 Faradays per mole of titanium, and, preferably, between 1 and 8 Faradays per mole of titanium, through the reaction medium.

The invention can be carried out according to the three routes which are well known to electrochemists: with an imposed cathodic potential, with a regulated cathodic potential or at constant current.

Electrochemical oxido-reduction with an imposed cathodic potential is carried out with an apparatus comprising a reference electrode (for example Ag/AgCl/Cl), a working electrode (cathode) and a soluble aluminum auxiliary electrode (anode). A constant potential is imposed between the reference electrode and the cathode. The voltage regulator connected between cathode and anode then delivers the working voltage. The constant potential imposed is between −0.5 and −1 volt.

The regulated cathodic potential route establishes a given working voltage between the cathode and the anode without using a reference electrode. It has been established that these reactions (solubilization of the aluminum anode and reaction with the halogenated solvent, reduction of the titanium (IV) derivative at the cathode) are possible without the titanium (III) derivative obtained being further reduced at the cathode. The process can therefore be carried out at a regulated cathodic potential of between 20 and 200 volts Passing an initial Faraday per mole of titanium reduces the titanium (IV) derivative to a titanium (III) derivative and produces, per gram-atom of titanium, 1 gram-equivalent of aluminum in the form of a halogenated organoaluminum derivative. The passage of the following Faradays allows the quantity of the halogenated organoaluminum derivative to be increased without reduction of the titanium (III) compound formed.

Constant current oxido-reduction predetermines the value of the current which will travel through the electrolyte and uses a regulatory apparatus instantaneously to deduce the value of the potential difference to be applied between the anode and the cathode to maintain the current at the chosen value. According to this route, the electrolysis is carried out advantageously for the present invention at a current of between 100 mA and 100 A.

The process according to the invention is carried out in an electrolytic cell whose cathode is made of a metal (generally a metallic basket) chosen in particular from platinum, iron, aluminum and their respective alloys. The cathode can be the electrolytic cell itself, which is then made of metal. The aluminum or aluminum-based alloy anode is therefore located near the internal wall of the cell. If anode and cathode are both aluminum or aluminum alloy, it is then possible to carry out the electrolysis using alternating current.

The reaction medium obtained after electrolysis may be used as a catalyst for the polymerization of olefins. It may also be used in the presence of at least one organoaluminum activator such as, for example, trialkyl aluminum, aluminoxane, siloxane or siloxalane. The catalytic yields observed are satisfactory.

It is moreover possible to improve the performances of the catalytic compositions thus obtained by adding a support such as, for example, a magnesium halide Two routes are thus possible and consist either in carrying out the simultaneous electrochemical oxidation and the electrochemical reduction in the presence of the magnesium halide or, preferably, in adding the magnesium halide to the reaction medium after electrolysis. In both cases, the atomic ratio Mg/Ti is advantageously less than or equal to 15.

Moreover, although dialkyl magnesium compounds are powerful reducing agents, it has surprisingly been found that their addition to the reaction medium after electrolysis allows nascent magnesium halide to be formed without appreciable reduction of the titanium (III) compound formed According to this third route, at least one organo-magnesium derivative of formula R-Mg-R', in which R and R' are alkyl radicals which may be identical or different and have from 1 to 12 carbon atoms, is added to the reaction medium, after electrolysis, to obtain an atomic ratio Mg/Ti of up to 15. The organo-magnesium derivative is chosen, for example, from n-butylethyl- magnesium, n-butyl-s-butyl magnesium, di-n-hexyl magnesium and n-butyl-n-octyl magnesium.

The activity of the catalytic compositions according to the invention may also be improved by adding to the reaction medium, after electrolysis, at least one vanadium (III), (IV) or (V) compound in a molar ratio V/Ti of up to 6, corresponds to the general formula indicated above. It may be added to the reaction medium in solution in an inert solvent such as a saturated hydrocarbon having from 6 to 12 carbon atoms, for example a cut of $C_{10}$–$C_{12}$ saturated aliphatic hydrocarbons.

A further subject of the present invention is a catalytic composition for the polymerization of olefins comprising at least one titanium compound and at least one halogenated organo-aluminum compound in suspension in at least one $\alpha,\omega$-dihalogenoalkane. In this composition, the titanium compound is essentially a titanium (III) compound and the overall content of titanium (II) and titanium (IV) is less than or equal to 15% of the total titanium content. The composition also contains in addition at least one inorganic magnesium compound in suspension.

The halogenated organo-aluminum compound has the general formula $X_2Al(CH_2)_nAlX_2$ in which X is a halogen, preferably chlorine, and n is between 1 and 10.

The catalytic composition may also contain an inert solvent. The $\alpha,\omega$-dihalogenoalkane and the inert solvent have the definitions already described above.

The oxidation state of the titanium compound is determined by redox titration in three parts, the first allowing the calculation of $Ti^{2+}+Ti^{3+}$, the second $2Ti^{2+}+Ti^{3+}$, the content of valency II titanium compounds being therefore obtained by difference, and the third $Ti^{2+}+Ti^{3+}+Ti^{4+}$ (total quantity of titanium which permits the content of $Ti^{4+}$ compounds to be deduced). The method used is described in detail below Generally the content of tetravelent titanium derivatives is very low, or even undetectable. The content of divalent derivative is generally low, for example, less than 2 mol %.

By inorganic magnesium compound is understood a magnesium salt of a mineral acid, such as a halide, advantageously magnesium chloride, preferably in the anhydrous form. The inorganic magnesium compound may be formed in situ during the preparation of the catalytic composition, for example by reaction between a magnesium derivative and the halogenated derivatives present in the electrolyte.

The catalytic composition may also contain at least one vanadium compound, advantageously with valency III, such as the chloride $VCl_3$.

In the catalytic composition according to the invention, the following atomic ratios are advantageously chosen: Cl/Ti between 10 and 180, preferably between 20 and 60; Al/Ti between 0.5 and 12, preferably between 3 and 6; Mg/Ti between 1 and 15, preferably between 3 and 8; and V/Ti between 0 and 6, preferably between 0 and 3.

The catalytic composition according to the invention may in addition contain at least one $\alpha$-olefin having, for example, from 4 to 16 carbon atoms, possibly in the at least partially polymerized state.

The catalytic composition may be prepared, for example, by mixing the constituents, it being possible to prepare the halogenated organo-aluminum compound according to the teaching of U.S. Pat. No. 3,787,383. It is advantageously prepared according to the process described above including the supplementary step of the addition of magnesium halide, before or after electrolysis Alternatively, an organo-magnesium derivative is added after electrolysis, which allows the magnesium halide to be obtained in situ.

This catalytic composition may be used for the polymerization. The catalytic composition includes at least one activator comprising at least one organo-metallic derivative of groups I to III of the period classification of the elements. The organometallic derivative is, preferably, an organo-aluminum derivative. The quantity of the organo-metallic derivative is such that the atomic ratio Al(added)/Ti(+V) may be up to 100.

The activator is advantageously chosen from the trialkyl aluminum compounds $AlR_3$, the tetraalkyl aluminoxanes RR'Al-O-AlR"R"', the mono-alkyl-silanolatodialkyl aluminum compounds R-SiH$_2$-O-AlR'R" and their mixtures, the alkyl radicals R, R', R", R"', which may be identical or different, having from 1 to 12 carbon atoms One may cite, for example, triethyl aluminum, tri-n-butyl aluminum, tri-octyl aluminum, tetra-iso-butyl aluminoxane and methyl-silanolato-di-isobutyl aluminum.

A further subject of the present invention is also a process for the polymerization of olefins, at a temperature of between 20 and about 350° C., in the presence of a catalytic composition such as described above. The olefins which may be polymerized according to this procedure include, in particular, ethylene and the $\alpha$-olefins having from 3 to 6 carbon atoms, such as propylene, but1-ene and 4-methylpent-1-ene. Ethylene may also be copolymerized with $\alpha$-olefins having from 3 to 12 carbon atoms, such as, as well as those which have already been cited, hex-1-ene and oct-1-ene.

The polymerization or the copolymerization may be carried out according to a continuous or discontinuous process, in an autoclave reactor or a tube reactor.

The polymerization of ethylene, alone or with at least one $\alpha$-olefin, may be carried out at a temperature of between 20° C. and 250° C., under a pressure of up to about 200 bars, in solution or in suspension in an inert hydrocarbon having at least 6 carbon atoms, such as a cut of $C_{10}$–$C_{12}$ saturated aliphatic hydrocarbons. The concentration of titanium derivative in the catalytic composition of the Ziegler type is advantageously between 100 and 400 millimoles per liter.

It may also be carried out, in a continuous manner, in a reactor in which the mean residence time of the catalytic composition is between 1 and 150 seconds, and at a temperature of between 160° and 350° C. under a pressure of between 400 and 3,000 bars.

The molecular weight of the polymers obtained may be adjusted by carrying out the polymerization or the copolymerization in the presence of up to 2 mole % of a chain transfer agent, such as hydrogen.

The following examples are given with the intention of illustrating the invention without limiting it.

EXAMPLES 1 TO 17

Preparation of the Catalytic Composition

The catalytic composition is prepared in an electrolytic cell represented schematically in FIG. 1. The body of the cell (1) is provided with a double jacket (2) allowing the temperature to be controlled. The anode (3) and the cathode (4) are cylindrical and coaxial. The reaction medium is magnetically stirred by means of the bar (5). The catalytic compositions are prepared under an inert atmosphere.

During the preparation of catalytic compositions according to the variant using an imposed cathodic potential, the electrolysis is carried out with the aid of a voltage regulator supplying a voltage E such that $E = -V_A - V_C + RI$, where $V_A$ is the anodic potential, $V_C$ the cathodic potential imposed with the aid of the voltage regulator, and RI the voltage drop which represents the larger part of the voltage E to be applied. The apparatus, therefore, comprises three electrodes:

(1) a Ag/AgCl/Cl$^-$ reference electrode whose chlorine ion is provided by a 0.02 mole/liter solution of tetrabutylammonium chloride;
(2) a cathode (platinum basket) maintained at a voltage $V_C$ with respect to the reference electrode; and
(3) an anode in the form of an aluminum cylinder.

The reference electrode is situated near the cathode. Weighing the anode before and after electrolysis allows the calculation, by difference, of the quantity of aluminum consumed, and therefore combines with the chlorinated solvent to form the chlorinated organo-aluminum compound.

The amount of electricity which has travelled through the electrolyte is measured by means of an integrator placed in series in the anode circuit or the cathode circuit.

During preparation of catalytic compositions according to the variant using a regulated cathodic potential, the electrolysis is carried out by applying a constant voltage $V_A - V_C$, expressed in volts, between:
an aluminum anode; and
a cathode, generally a platinum basket.
A potential difference is imposed between the anode and the cathode.

Table I summarizes the conditions used. In all these experiments:
(i) the quantity of halogenated solvent was 35 ml;
(ii) the anode was an aluminum cylinder;
(iii) the reference electrode (in the experiments conducted with an imposed cathodic potential) was a Ag/AgCl/Cl$^-$ electrode;
(iv) the cathode voltage with respect to the reference electrode (in the experiments using an imposed cathodic potential) was −0.5 volt;
(v) the temperature was 35° C.; and
(vi) nitrogen was used as the inert atmosphere.

The following abbreviations indicate:
SX: the nature of the halogenated solvent used:
DCM is dichloromethane ClCH$_2$Cl
DCE is 1,2-dichloroethane Cl-CH$_2$-CH$_2$-Cl.
[TiCl$_4$]: is the concentration of TiCl$_4$, in millimoles per liter, in the halogenated solvent.
CA: the conductivity additive used, with, between brackets, the molar ratio conductivity additive/TiCl$_4$.
$V_A - V_C$: the voltage between the anode and the cathode, for the experiments using regulated cathodic potential.
t: the electrolysis time in minutes.
F: the number of Faradays which have travelled through the electrolyte at the end of the preparation, per mole of titanium.

TABLE I

Electrolysis Using Imposed Cathodic Potential

| Example | SX | [TiCl$_4$] | CA | t | F |
|---|---|---|---|---|---|
| 1 | DCM | 28.6 | — | 300 | 1 |
| 2 | DCM | 28.6 | Hex-1-ene (8) | 70 | 1 |
| 3 | DCE | 28.6 | Hex-1-ene (8) | 55 | 1 |
| 4 | DCE* | 28.6 | Hex-1-ene (8) | 300 | 1 |
| 5 | DCE | 28.6 | Hex-1-ene (8) | 135 | 3 |
| 6 | DCE | 143 | Hex-1-ene (1.6) | 750 | 1 |
| 7 | DCE | 286 | Hex-1-ene (0.8) | 1200 | 3 |
| 8 | DCM | 28.6 + VOCl$_3$ 28.6 | Hex-1-ene (8) | 130 | 1 |

*DCE: 17.5 ml + cut of C$_{10}$-C$_{12}$ saturated hydrocarbons (inert solvent): 17.5 ml.

Electrolysis at Regulated Voltage (Halogenated Solvent: DCE)

| Example | [TiCl$_4$] | CA (hex-1-ene) | Cathode | $V_A - V_C$ | F |
|---|---|---|---|---|---|
| 9 | 286 | (0.8) | Pt | 20 | 3 |
| 10 | 28.6 | (8) | Pt | 50 | 3 |
| 11 | 572 | (0.4) | Pt | 50 | 3 |
| 12 | 286 | (0.8) | Pt | 50 | 5 |
| 13 | 286 | (0.8) | Pt | 50 | 6 |
| 14 | 286 | (0.8) | Pt | 50 | 8 |
| 15 | 286 | (0.8) | Pt | 70 | 3 |
| 16 | 28.6 | (8) | Al | 50 | 3 |
| 17 | 28.6 | (8) | Steel | 50 | 3 |

EXAMPLES 18 TO 43

Modification of the Catalytic Compositions

EXAMPLE 18

To the catalytic composition obtained in Example 1 is added a quantity of vanadium oxytrichloride (VOCl$_3$) such that the atomic ratio V/Ti in the modified catalyst is equal to 1.

EXAMPLE 19

To the catalytic composition obtained in Example 3 is added a quantity of VOCl$_3$ such that the atomic ratio V/Ti in the modified catalyst is equal to 1.

EXAMPLE 20

To the catalytic composition obtained in Example 2 is added a quantity of finely ground MgCl$_2$ such that the atomic ratio Mg/Ti in the modified catalytic composition is equal to 6.

EXAMPLE 21

To the catalytic composition obtained in Example 2 is added a quantity of n-butyl ethyl magnesium such that the atomic ratio Mg/Ti in the modified catalytic composition is equal to 7.

EXAMPLE 22

The same process as in Example 21 is repeated using the catalytic composition obtained in Example 3 as the starting material. The Mg/Ti ratio is equal to 6.5.

EXAMPLE 23

To the catalytic composition obtained in Example 18 is added a quantity of n-butyl ethyl magnesium such that the atomic ratio Mg/Ti is equal to 6.

EXAMPLE 24

To the catalytic composition obtained in Example 3 are added a quantity of $VOCl_3$ such that the atomic ratio V/Ti is equal to 1. Then, a quantity of n-butyl ethyl magnesium is added such that the atomic ratio Mg/Ti is equal to 6.5.

EXAMPLE 25

The process in Example 24 is repeated in totality on the catalytic composition obtained in Example 4.

EXAMPLE 26

The process in Example 24 is repeated in totality on the catalytic composition obtained in Example 5.

EXAMPLE 27

To the catalytic composition obtained in Example 5 are added first a quantity of n-butyl ethyl magnesium such that the atomic ratio Mg/Ti is equal to 6, then a quantity of $VOCl_3$ such that the atomic ratio V/Ti is equal to 1.

EXAMPLES 28 TO 39

The process in Example 27 is repeated in totality on, respectively, the catalytic compositions obtained in Examples 4, 6, 7, 11, 10, 16, 17, 9, 12, 13, 14, and 15.

EXAMPLE 40

To the catalytic composition obtained in Example 10 are added successively sufficient vanadyl tri(isobutylate)($VO(C_4H_9O)_3$) to obtain an atomic ratio V/Ti equal to 1. Then, sufficient n-butyl ethyl magnesium is added to obtain an atomic ratio Mg/Ti equal to 6.

EXAMPLE 41

The operating method of Example 10 was repeated, replacing $TiCl_4$ with $Ti(OC_4H_9)_2Cl_2$.

EXAMPLE 42

To the catalytic composition obtained in Example 41 was added n-butyl ethyl magnesium in a quantity such that the atomic ratio Mg/Ti is equal to 6.

EXAMPLE 43

The operating method of Example 13 was repeated using a steel electrolytic cell, whose trough was used as the cathode. The anode is an aluminum plate placed a small distance from the internal wall of the cell. After the passage of 3 Faradays per mole of titanium under a voltage $V_A$-$V_C$ of 50 volts, n-butyl ethyl magnesium is added to the catalytic composition obtained until an atomic ratio Mg/Ti equal to 6 is obtained. Then, $VOCl_3$ is added until an atomic ratio V/Ti equal to 1 is obtained.

EXAMPLES 44 TO 63

Homopolymerization of Ethylene at 80° C.

600 ml of a cut of $C_{10}$–$C_{12}$ saturated aliphatic hydrocarbons then a quantity of triethyl aluminum such that the ratio Al/Ti after introduction of the catalytic composition will be equal to 100, are introduced into a stirred reactor, maintained at 80° C. by means of a water-bath. The apparatus is purged with nitrogen and then saturated with ethylene up to a pressure of 1.1 bar. The required quantity of the catalytic composition is then injected. After one hour, 20 ml of ethanol are added to stop the polymerization. The polyethylene obtained is collected and then separated off, washed, dried and weighed. The catalytic yield ($R_c$) is expressed in groups of polyethylene formed per millimole of titanium, or of titanium+vanadium as appropriate, per hour.

The results obtained are given in Table II.

TABLE II

| Example | Catalytic composition of example | $R_c$ |
| --- | --- | --- |
| 44 | 1 | 125 |
| 45 | 2 | 150 |
| 46 | 5 | 290 |
| 47 | 8 | 215 |
| 48 | 10 | 300 |
| 49 | 41 | 266 |
| 50 | 18 | 790 |
| 51 | 19 | 460 |
| 52 | 20 | 205 |
| 53 | 21 | 520 |
| 54 | 22 | 1335 |
| 55 | 23 | 1035 |
| 56 | 24 | 1710 |
| 57 | 26 | 2185 |
| 58 | 32 | 1165 |
| 59 | 33 | 1260 |
| 60 | 34 | 1240 |
| 61 | 40 | 1383 |
| 62 | 42 | 2080 |
| 63 | 43 | 1280 |

EXAMPLES 64 to 81

Homopolymerization of Ethylene at 200° C.

600 ml of a cut of $C_{10}$–$C_{12}$ saturated hydrocarbons are introduced into an autoclave reactor with a capacity of 1 liter and provided with means of stirring and of temperature regulation. The apparatus is purged with nitrogen while raising the temperature to 200° C. 0.1 millimole (expressed as Ti+V) of the catalytic composition are then introduced, followed by the activator and ethylene up to a pressure of 6 bars, which pressure is maintained for 1 minute.

The contents of the reactor are then discharged and the polymer is separated off, washed, dried and weighed. The quantity (Q) obtained is expressed as grams per gram-milliatom of transition metal per minute per mole $1^{-1}$ of ethylene.

The catalytic composition used (no. of the example in which its preparation is described), the nature of the activator, the atomic ratio Al (in the activator)/Ti (or Ti+V) (in the catalytic composition) and the quantity (Q) of polyethylene obtained are given in Table III. The activators used are shown by:
TEA: triethyl aluminum;
TiBAO: tetra-iso-butyl aluminoxane; and
Siloxal $H_2$ methyl-silanolato-di-isobutyl aluminum.

The ratios of activators indicated in brackets are molar ratios.

TABLE III

| Example | Catalyst according to Example | Activator | Al/Ti (or Al/Ti + V) | Q |
| --- | --- | --- | --- | --- |
| 64 | 24 | TEA | 10 | 290 |

TABLE III-continued

| Example | Catalyst according to Example | Activator | Al/Ti (or Al/ Ti + V) | Q |
|---|---|---|---|---|
| 65 | 25 | TEA | 10 | 355 |
| 66 | 28 | TEA | 10 | 435 |
| 67 | 28 | TiBAO | 10 | 585 |
| 68 | 28 | TiBAO | 20 | 575 |
| 69 | 28 | SILOXAL $H_2$ | 20 | 570 |
| 70 | 28 | TiBAO/SILOXAL $H_2$ (0.5/0.5) | 20 | 810 |
| 71 | 27 | TiBAO/SILOXAL $H_2$ (0.5/0.5) | 20 | 925 |
| 72 | 29 | TiBAO/SILOXAL $H_2$ (0.5/0.5) | 20 | 890 |
| 73 | 29 | TEA/SILOXAL $H_2$ (0.35/0.65) | 20 | 960 |
| 74 | 30 | TiBAO/SILOXAL $H_2$ (0.5/0.5) | 20 | 1220 |
| 75 | 30 | TEA/SILOXAL $H_2$ (0.25/0.75) | 20 | 1310 |
| 76 | 31 | TEA/SILOXAL $H_2$ (0.25/0.75) | 20 | 1395 |
| 77 | 35 | TEA/SILOXAL $H_2$ (0.25/0.75) | 20 | 1060 |
| 78 | 36 | TEA/SILOXAL $H_2$ (0.25/0.75) | 20 | 1250 |
| 79 | 37 | TEA/SILOXAL $H_2$ (0.25/0.75) | 20 | 1120 |
| 80 | 38 | TEA/SILOXAL $H_2$ (0.25/0.75) | 20 | 1170 |
| 81 | 39 | TEA/SILOXAL $H_2$ (0.25/0.75) | 20 | 1505 |

EXAMPLES 82 to 89

Copolymerization of Ethylene With at Least One α-Olefin at 200°-260° C.

The polymerization installation functions continuously and comprises a stirred, temperature-controlled autoclave reactor, fed with a mixture of ethylene and α-olefin by means of 2 compressors arranged in series. The second compressor receives in addition the monomers which have not reacted and which come form a separator into which the product from the reactor flows continuously. The separator is placed immediately downstream of an expansion valve situated at the exit from the reactor and is held at a pressure of about 250 bars. The polymer collected from the bottom of the separator is introduced, via an expansion valve, into a hopper from where the polymer, separated under a pressure of about 10 bars, flows into an extruder. The gases rising from the hopper are recycled to the inlet of the first compressor.

The mixture of ethylene and α-olefin is introduced continuously into the reactor, into which the catalytic composition is also admitted. The activator TEA (25 mole %)-SILOXAL $H_2$ (75 mole %) was used in all examples except for Example 86, in which a mixture of 15% TEA-85%-SILOXAL $H_2$ was used. The ratio Al/Ti(+V) was equal to 20. The temperature is regulated to the desired value while the pressure is maintained at 800 bars for Examples 82 to 85 and 87 to 89, or 1200 bars for Example 86. The copolymer collected after extrusion and granulation is weighed. The catalytic yield ($R_c$) is here expressed as kg copolymer per gram-milliatom of titanium (or of titanium and vanadium, as necessary).

The following are determined for the copolymer obtained:
the melt index MI, measured according to standard ASTM D-1238 condition E and expressed in dg/min.

the density d, measured according to standard ASTM D-792.

The conditions used and the results obtained are given in Table IV. F indicates the composition of the gaseous flow (% by weight each of the monomers), E ethylene, P propylene, B but-1-ene and M 4-methylpent-1-ene. The catalytic composition used is referred to by means of the example describing its preparation. The polymerization temperature is expressed in ° C. H represents the level of hydrogen (transfer agent) as % by volume.

TABLE IV

| Example | F (% by wt.) | | | | H | T | Catalytic composition used | $R_c$ | MI | d |
|---|---|---|---|---|---|---|---|---|---|---|
| | E | P | B | M | | | | | | |
| 82 | 65 | — | 35 | — | 0.1 | 240 | Ex. 30 | 25 | 3.7 | 0.928 |
| 83 | 50 | — | 50 | — | 0.1 | 240 | Ex. 30 | 22 | 5.7 | 0.925 |
| 84 | 50 | — | 50 | — | 0.1 | 260 | Ex. 30 | 12 | 16.4 | 0.923 |
| 85 | 50 | — | 50 | — | 0.1 | 220 | Ex. 31 | 29 | 1.3 | 0.927 |
| 86 | 39 | — | — | 61 | 0.03 | 240 | Ex. 37 | 11 | 2.2 | 0.926 |
| 87 | 50 | 25 | 25 | — | — | 250 | Ex. 39 | 10.5 | 8.9 | 0.905 |
| 88 | 35 | 40 | 25 | — | — | 225 | Ex. 39 | 12.5 | 8.8 | 0.882 |
| 89 | 30 | 35 | 35 | — | 0.02 | 200 | Ex. 37 | 14.6 | 1 | 0.891 |

EXAMPLE 90

Determination of the Valency of Titanium in the Titanium Compounds Obtained by Electrochemical Reduction The following are subjected to analysis The reaction medium obtained after electrochemical oxido-reduction and containing the excess of halogenated solvent, and where required an inert solvent; the organo-aluminum compound formed by oxidation; and the titanium (III) compound formed by reduction. The valency states of the titanium are determined by means of a three-part redox titration. The first step allows the calculation of the content of $Ti^{2+} + Ti^{3+}$. $Ti^{2+}$ is oxidized to $Ti^{3+}$ by means of protons introduced in the form of a 2N solution of HCl prepared with degassed distilled water. The $Ti^{3+}$ formed, together with the $Ti^{3+}$ originally present, are then oxidized to $Ti^{4+}$ by means of an excess of a 0.2N solution of $Fe^{3+}$. $Fe^{3+}$ is reduced to $Fe^{2+}$, which is titrated using potassium bichromate in a sulphuric-phosphoric acid medium in the presence of 0.2% sodium diphenylaminesulphonate. The quantity of $Fe^{2+}$ thus determined corresponds to the $Ti^{2+} + Ti^{3+}$ ions originally present in the catalytic composition. The second step allows the content of $2Ti^{2+} + Ti^{3+}$ to be calculated. It consists in oxidizing $Ti^{2+}$ and $Ti^{3+}$ by means of an excess of a solution of $Fe^{3+}$ ions, in the presence of protons to avoid the oxidation of $Ti^{2+}$ to $Ti^{3+}$, in accordance with the reactions:

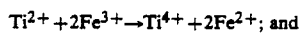

$Ti^{2+} + 2Fe^{3+} \rightarrow Ti^{4+} + 2Fe^{2+}$; and

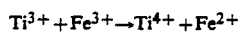

$Ti^{3+} + Fe^{3+} \rightarrow Ti^{4+} + Fe^{2+}$

The $Fe^{2+}$ ion is then titrated by means of potassium bichromate as above. The value obtained corresponds to the sum $2Ti^{2+} + Ti^{3+}$ present in the catalytic composition. The third step allows the determination of the content of $Ti^{4+}$ by reduction, by means of triethyl aluminum in accordance with an atomic ratio Al/ Ti equal to 6, of the titanium (IV) present to titanium (III) and titanium (II). The titration is then carried out in the same way as the first step above. The value of $Ti^{2+} + Ti^{3+}$ found corresponds to the sum $Ti^{2+} + Ti^{3+}$ +Ti⁴⁺ of ions present in the analyzed catalytic composition and to the total titanium content. The various percentages are calculated by solving the following equations:

$$Ti^{2+} + Ti^{3+} = A$$

$$2Ti^{2+} + Ti^{3+} = B$$

$$Ti^{2+} + Ti^{3+} + Ti^{4+} = C$$

Thus, the catalyst obtained in Example 12 contains 97.1% Ti(III), 1.8% Ti(II) and 1.1% titanium (IV). After storage for 2 months at ambient temperature and protected from light, these contents became, respectively: 85.5%, 6.5% and 7.9%. The addition of butyl ethyl magnesium to the freshly prepared catalyst does not noticeably modify the content of Ti(III) which is then found to be 96.6%.

Other embodiments of the invention will be apparent to one skilled in the art from a consideration of the specification or with practice of the disclosed invention. It is intended that the specification and examples be considered as exemplary only with the true scope and spirit of the invention indicated by the claims.

What is claimed is:

1. A process for the preparation of a catalytic composition for the polymerization of olefins comprising:
   at least partial electrochemical oxidation of aluminum in a solvent of at least one α,ω-dihalogenalkane, and
   simultaneously the electrochemical reduction of a compound of titanium (IV).

2. The process according to claim 1, wherein the oxidation and reduction is carried out in the presence of an inert solvent further comprising at least one saturated aliphatic or cycloaliphatic hydrocarbon having from 6 to 14 carbon atoms.

3. The process according to claim 1, wherein the oxidation and reduction is carried out in the presence of at least one α-olefin having from 4 to 16 carbon atoms.

4. The process according to claim 1, wherein the titanium (IV) compound has the formula $Ti(OR)_nX_{4-n}$, in which X is a halogen, $0 \leq n \leq 4$ and R is an alkyl radical having from 1 to 10 carbon atoms.

5. The process according to claim 1, wherein the concentration of titanium (IV) compound in the reaction medium is between 20 and 600 millimoles per liter.

6. The process according to claim 1, further comprising adding to the reaction medium during the simultaneous electrochemical oxidation and electrochemical reduction a vanadium (IV) or vanadium (V) compound chosen from (i) the compounds of general formula $VO(OR)_mX_{3-m}$, in which X is a halogen, R is an alkyl radical having from 1 to 6 carbon atoms and $0 \leq m \leq 3$, and (ii) the compounds of formula $VX_4$, in which X is a halogen.

7. The process according to claim 1, wherein the simultaneous electrochemical oxidation and electrochemical reduction are carried out by passing a quantity of electricity of between 1 and 12 Faradays per mole of titanium through the reaction medium.

8. The process according to claim 7, wherein the electricity is passed by use of an imposed cathodic potential of between −0.5 and −1 volt.

9. The process according to claim 7, wherein the electricity is passed by use of a regulated cathodic potential of between 20 and 200 volts.

10. The process according to claim 1, wherein the simultaneous electrochemical oxidation and electrochemical reduction take place in the presence of at least one magnesium halide.

11. The process according to claim 1, further comprising adding to the reaction medium after the simultaneous electrochemical oxidation and electrochemical reduction, at least one magnesium halide or at least one organo-magnesium derivative of formula R-Mg-R′, in which R and R′ are alkyl radicals, which may be identical or different, having from 1 to 12 carbon atoms.

12. The process according to claim 11, wherein the magnesium halide or the organo-magnesium derivative is used to obtain an atomic ratio Mg/Ti less than or equal to 15.

13. The process according to claim 1, further comprising adding to the reaction medium after the simultaneous electrochemical oxidation and electrochemical reduction, at least one compound of vanadium (III), (IV) or (V).

14. The process according to claim 13, wherein the compound of vanadium (III), (IV) or (V) is added to give an atomic ratio V/Ti of up to 6.

* * * * *